United States Patent [19]

Hirzel

[11] Patent Number: 5,052,107
[45] Date of Patent: Oct. 1, 1991

[54] CHESTNUT CUTTER

[76] Inventor: Suzy C. Hirzel, 933 Shellwood Way, Sacramento, Calif. 95831

[21] Appl. No.: 500,899

[22] Filed: Mar. 29, 1990

Related U.S. Application Data

[63] Continuation-in-part of Ser. No. 325,781, Mar. 20, 1989, abandoned.

[51] Int. Cl.⁵ .......................... A47J 43/26; B25B 7/00; B26B 17/00
[52] U.S. Cl. .................................... 30/120.3; 30/120.1; 30/120.2
[58] Field of Search .................. 30/120.2, 120.3, 120.4, 30/120.5

[56] References Cited

U.S. PATENT DOCUMENTS

| | | | |
|---|---|---|---|
| 1,710,629 | 4/1929 | Lindsey | 30/120.3 |
| 2,700,994 | 2/1955 | Welfel | 30/120.3 |
| 2,804,111 | 8/1957 | Burchitt | 30/120.3 |
| 3,048,208 | 8/1962 | Umanoff | 30/120.3 |
| 4,550,495 | 11/1985 | Fornes | 30/120.3 |

FOREIGN PATENT DOCUMENTS

| | | | |
|---|---|---|---|
| 232827 | 5/1959 | Australia | 30/120.3 |
| 3139052 | 4/1983 | Fed. Rep. of Germany | 30/120.2 |
| 975797 | 3/1951 | France | 30/120.5 |
| 19608 | of 1897 | United Kingdom | 30/120.3 |

Primary Examiner—Douglas D. Watts
Assistant Examiner—Paul M. Heyrana, Sr.

[57] ABSTRACT

The present invention, a hand held Chestnut Cutter which is adaptable for all sizes of the chestnuts. This cutter is similar in shape and system to a hand held garlic press or nut cracker. Nut cutter is comprised of a pair of levers which are pivotally joined together at their front ends, or center by a bolt or pin. The upper lever carries a cutting blade and the lower lever has a cavity for receiving the chestnut and has opening at the bottom for tail of chestnut. To cut the chestnut, place the chestnut in the lower lever ring, and push down the upper lever blade towards the chestnut and it will cut the top of the shell.

2 Claims, 2 Drawing Sheets

_2,107_

CHESTNUT CUTTER

This application is a continuation-in-part of Ser. No. 07/325,781 filed Mar. 20, 1989, now abandoned.

1. Field of Invention

The present invention relates to a hand held nut cutter and, more particularly, to an improved chestnut shell cutter.

2. Prior Art

Most people use the knife to puncture the chestnut shell. This method is very dangerous because the knife can easily slip and wound the user's hand.

Table top model chestnut cutter has been employed to pierce a shell safely as disclosed in U.S. Pat. No. 3,924,326 by Gaetano. However, this model is not a hand held nut cutter, and requires a flat surface to use.

To roast a chestnut, it is most desirable to cut the top of the chestnut. This will make peeling the shell easy, without breaking the nut-meat. Since the chestnut has a pointed bottom, Gaetano's nut cutter can be punctured only on the side of the nut.

SUMMARY OF THE INVENTION

The present invention relates generally to a shell cutting advice, and more particularly, to a hand held chestnut cutter which is adaptable for all sizes of chestnuts.

The present invention is comprised of a pair of levers which are pivotally joined together at their front ends by a bolt or pin. The upper lever carries a cutting blade. The lower lever has the securing elements, such as a spring, a hole in the bottom and an indentation on both sides to secure the nut.

This new chestnut shell cutter is similar in shape and methods to a hand held garlic press, or nut cracker.

To use the present invention, insert the chestnut in the receiving are of the lower lever with the chestnut top positioned facing up. Press down upper lever until the blade cut horizontally, approximately $\frac{7}{8}''$ top of the chestnut. Remove the chestnut from the lower lever, and roast in an oven at 450 degrees for 15 to 20 minutes or over an open fire until meat is tender. When roasted chestnuts are cool enough to touch, using both hands, split the shell open and push up the nut-meat.

DRAWINGS

DETAILED DESCRIPTION

FIG. 1, 2 AND 3

Figures 1, 2:
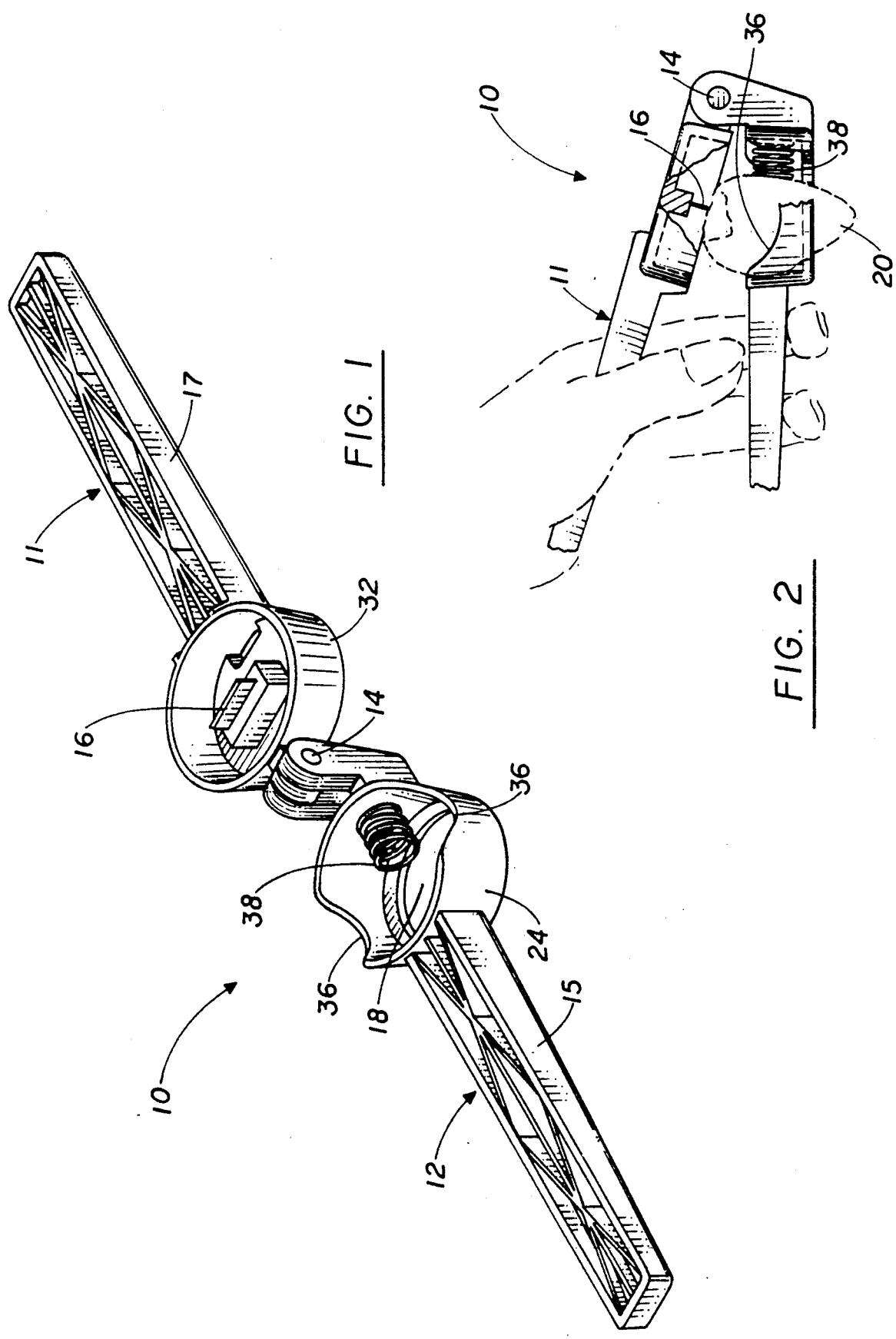
FIG. 1 is a perspective top view of the first embodiment of the Chestnut Cutter in open position.
FIG. 2 is a perspective view of the first embodiment of the Chestnut Cutter ready to cut the chestnut top.
Figure 3:
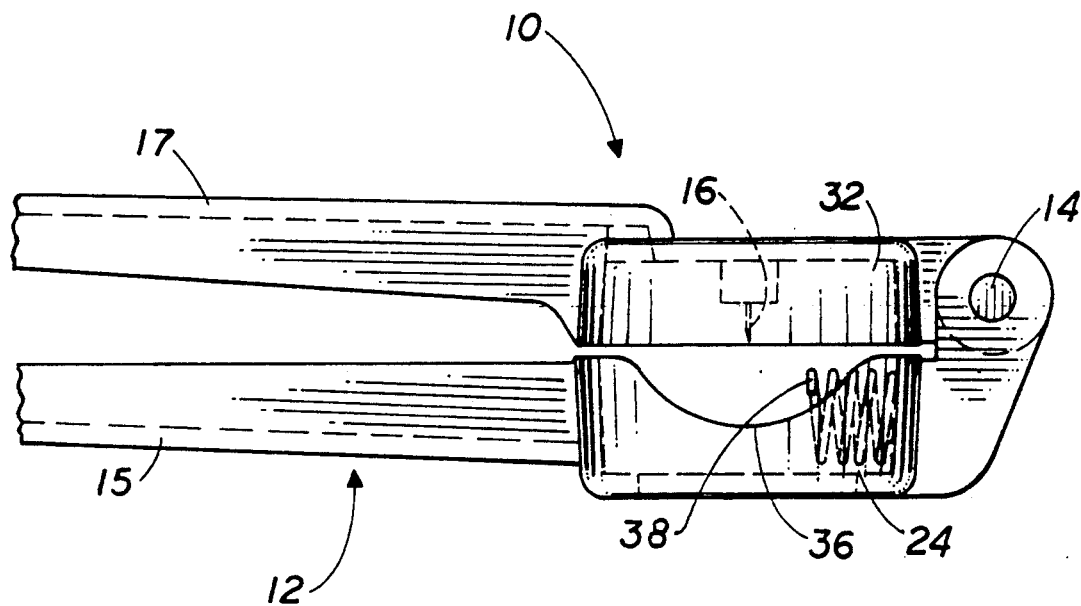
FIG. 3 is a side elevation view of the first embodiment of the Chestnut Cutter.

Referring more particularly to FIGS. 1, 2 and 3 embodiment of the first Chestnut Cutter of the present invention is schematically depicted therein, thus, 10 is shown, which is comprised of a pair of levers or generally indicated by numerals 11 and 12 which are pivotally joined together at their forward ends by a pin, bolt or hinge 14. The upper lever 11 carries the cutting element 16 and the lower lever 12 has a nut receiving element 18 in which the chestnut is placed.

The upper lever 11 has a handle portion 17 shaped similarly to lower handle 15. The handle portion 17 tapers outwardly to form a generally round cover 32. The round cover 32, inner side has a blade 18. The lower lever 12 has a handle portion 15 shaped similarly to handle 17. The handle portion 15 tapers outwardly to provide a generally round shaped base 24 and base has a center bottom opening 18 for chestnut tail 21 can pass through. Both sides on the base 24 has two indentations 36, to accommodate larger chestnuts. The securing, spring element, spring 38 is positioned in the rear wall 28 [FIG. 1], or front wall 29 [not shown]. Securing element 38 will hold the nut steady while operating the cutter.

To joint the two levers together pivotally, the bolt or pin 14 extends through suitable receiver base 24 of the lower lever and the cover 32 of the upper lever.

To secure and cut the chestnut 20, placed the chestnut in the base 24 and position the chestnut tail 21 in the opening 18, and chestnut top 11 in an up position, and chestnut flat back 44 against the spring 28. When upper lever 11 is moved towards the lower lever 12, the blade 16 enters the chestnut and cuts the shell approximately $\frac{7}{8}''$ horizontally, and 1/5" vertically. With this method, when chestnuts are roasted, shell will easily come off from nutmeat Chestnuts are generally oval shape, with rounded front 42 and flat back 44 and narrow sides 46. Narrow sides 46 are generally wider at the top and smaller at the bottom.

When chestnut is big and sides 46 are sticking out, indentation 36 will allow chestnut sides 46 out of the cover 24. This method will let the chestnut freely sit in the ring 18.

FIGS. 4

Figure 4:
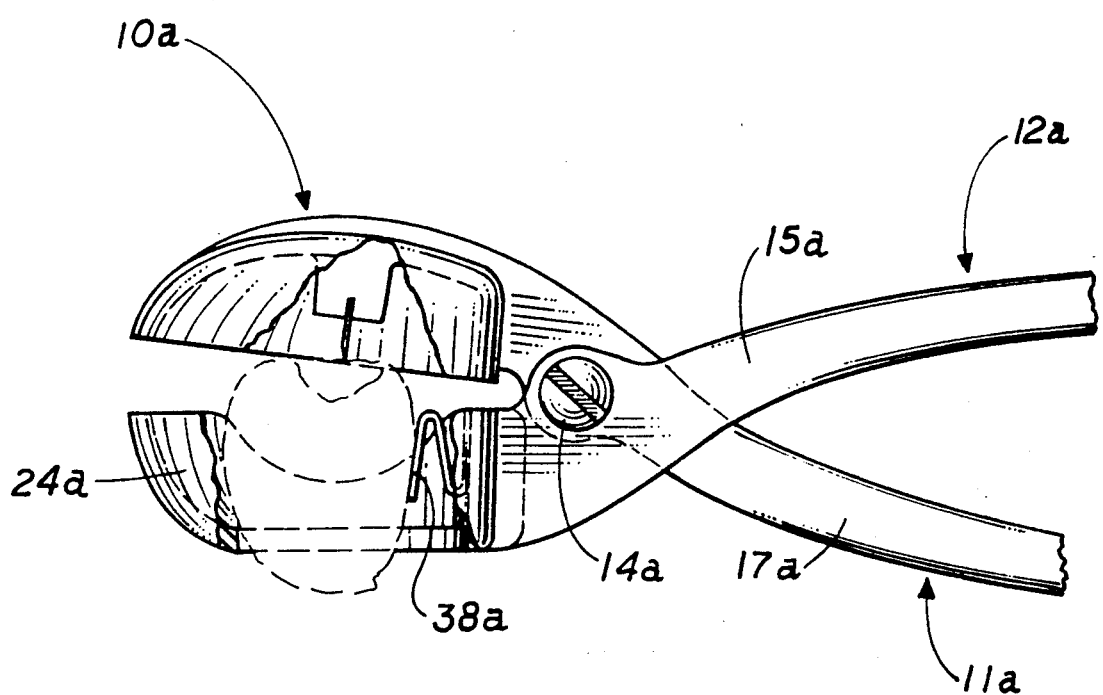
FIG. 4 is a perspective side view of the second embodiment of the Chestnut Cutter.

The second preferred embodiment of the Chestnut Cutter of the present invention is schematically depicted in FIG. 4. Thus, Assembly 10a is shown. Components thereof similar to those of assembly 10, bear the same numerals, but are succeeded by the letter "a". Assembly "10a" is identical to assembly 10 except as follows:

a) Chestnut Cutter, shown reference numerals 10a, has the general configuration of a pair of pliers. Upper lever 11a and lower lever 12a are disposed in cross relationship and are pivotally joined at their point of crossing by pin or bolt 14a.

b) Securing element, spring action is a flat tab 38a, which is connected to inner side base 24a and it is standing up vertically. Flat tap 38a may be single or double zigzagged and flexible, and similar to paper fan [not shown]. When chestnut is placed in the ring 18, the flat tab will adjust to one of the wall of the chestnut and will secure the nut. The tab 38a can be front or rear side of the inner base 24a, and the tab and cover are injection molded in one piece.

Various modifications, changes, alterations and additions can be made in the chestnut cutter of the present invention, its components and their parameters. All such modifications, changes, alterations and additions as are within the scope of the appended Claims form part of the present invention.

What is claimed as new is as follows:

1. A hand held chestnut shell cutting device in the form of a pair of pivotally connected levers comprising: handles, one with a bowl shaped base at one end pivotally connected to a similarly shaped bowl shaped cover attached to the end of the other handle, said bowl shaped base having a round through hole at the center, a securing element and a pair of indentations at the side thereof, said bowl shaped cover having a cutting element at the center directly in front and center of the said round through hole of said bowl shaped base so that upon pressing the said handles toward each other the said cutting element of said bowl shaped cover will cut the chestnut shell of the chestnut placed on said through hole of said bowl shaped base.

2. Chestnut shell cutting device according to claim 1, said securing device is a coiled spring mounted in an interior side of the said bowl shaped base between the said pair of indentations.

* * * * *